United States Patent [19]

Heinlein

[11] Patent Number: 4,610,581
[45] Date of Patent: Sep. 9, 1986

[54] END MILL AND METHOD

[75] Inventor: Joseph Heinlein, Oak Forest, Ill.

[73] Assignee: Lambert Consolidated Industries, Inc., Troy, Mich.

[21] Appl. No.: 615,671

[22] Filed: May 31, 1984

Related U.S. Application Data

[63] Continuation-in-part of Ser. No. 396,756, Jul. 9, 1982, abandoned.

[51] Int. Cl.⁴ .............................................. B23C 5/10
[52] U.S. Cl. .................................. 409/132; 144/240; 407/54
[58] Field of Search ...................... 407/53, 54, 30, 55, 407/56, 61; 409/131, 132, 182, 228, 229, 177; 144/219, 240; 408/230, 229, 227

[56] References Cited

U.S. PATENT DOCUMENTS

| 2,905,059 | 9/1959 | Fabish | 407/54 |
|---|---|---|---|
| 3,037,264 | 6/1962 | Mossberg | 407/53 |
| 3,217,382 | 11/1965 | Dobbelaere et al. | 407/53 |
| 3,548,476 | 12/1970 | Cave et al. | 407/54 |
| 3,736,634 | 6/1973 | Sonnie | 407/54 |
| 3,749,189 | 7/1973 | Boehm | 408/230 |
| 3,913,196 | 10/1975 | Maday | 407/54 |
| 3,942,411 | 3/1976 | Gerber | 409/137 |
| 4,285,618 | 8/1981 | Shanley, Jr. | 407/54 |

FOREIGN PATENT DOCUMENTS

| 8159 | 2/1980 | European Pat. Off. | 407/54 |
|---|---|---|---|
| 541218 | 6/1922 | France | 407/53 |
| 1337400 | 8/1963 | France | 407/53 |
| 42760 | 3/1980 | Japan | 407/53 |
| 607661 | 5/1978 | U.S.S.R. | 407/7 |

Primary Examiner—Gil Weidenfeld
Assistant Examiner—Daniel W. Howell
Attorney, Agent, or Firm—Hill, Van Santen, Steadman & Simpson

[57] ABSTRACT

An end mill adapted to make a full depth cut in a workpiece in a single pass and having the helix pitch angle of the cutting edges from 10° to 30°. In operation tightly curled substantially straight elongated chips substantially as long as the depth of cut in the workpiece are produced. A greatly increased feed rate is attained at greatly reduced rpm, as compared to conventional end mills.

15 Claims, 11 Drawing Figures

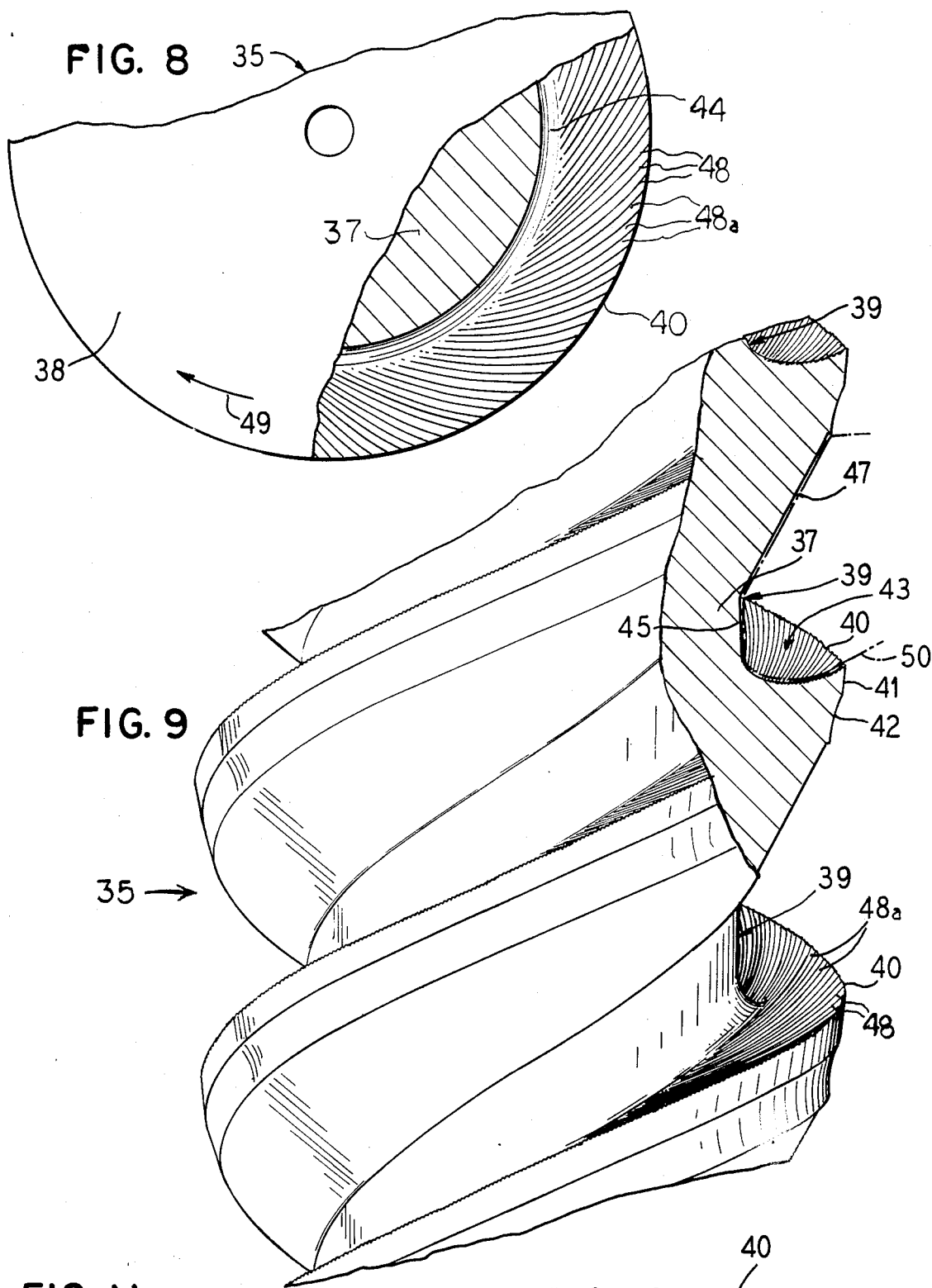

END MILL AND METHOD

The present application is a continuation-in-part of my pending application Ser. No. 396,756 filed July 9, 1982, now abandoned.

This invention relates to the art of milling metal, and is more particularly concerned with a new and improved end mill and method.

Prior end mills have been seriously limited as to rate of work feed and initial depth of cut. Commercial forms of those end mills have consistently been provided with helical flute cutting edges of high angle, such as on the order of 60° relative to a horizon normal to the axis of the tool. Such end mills have been run at high speeds, such as 300 to 400 rpm with constant large volume coolant stream and relatively low feed-in rate, such as about ⅜ inch per minute. These prior end mills generate small chips with a generally chopping action and the chips are flung from the tool in the high speed of rotation. Generally several passes are required to attain a desired depth of cut. Then the relatively rough generated surface must be finished.

I have discovered how to alleviate the identified problems inherent in conventional end mills, in a simple, extremely efficient and highly successful manner.

To this end, the present invention provides in an end mill having an elongate cylindrical shaft provided at one end with a shank for chucking the end mill in a milling machine spindle, and said shaft being equipped with flutes presenting helical workpiece cutting edges extending from said shank and running out at the opposite end of the shaft, comprising said cutting edges having a helix pitch angle of from 10° to 30°, surfaces at each flute defining with the cutting edge of the flute a rake angle and relief angle both of which are about 5° to 7°, said rake angle surface sloping on a concave curvature away from said cutting edge and merging on a continuing concave curvature with an overhang surface which runs out toward the relief angle surface thereabove, and said rake angle and relief angle surfaces in cooperation with said cutting edge running continuously along each flute from said shank to said opposite end of the shaft and being adapted in center thrust cutting operation to cut from the workpiece tightly curled chips substantially as long as the depth of cut in the workpiece.

This invention also provides an end mill having an elongate cylindrical shaft provided at one end with a shank for chucking the end mill in a milling machine spindle, and comprising at least one helical flute in said shaft and presenting a cutting edge extending continuously from said shank to the opposite end of said shaft, and small teeth on said cutting edge.

There is also provided by the present invention a method of milling a workpiece with an end mill having an elongate cylindrical shaft provided at one end with a shank for chucking the end mill in a milling machine spindle, and equipped with flutes providing helical cutting edges extending from said shank and running out at the opposite end of the shaft, said method comprising providing said cutting edges with a helix pitch angle of from 10° to 30°, and throughout the length of each of the cutting edges providing a concave rake surface merging with an upsweep surface leading into an overhang surface, operating said end mill in center thrust cutting relation to the workpiece and in such operating of the end mill causing said cutting edges to cut from the workpiece, and in combination with said surfaces, forming tightly curled substantially straight elongated chips substantially as long as the depth of cut in the workpiece.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 8 is a fragmentary, enlarged scale top end view of another three-flute end mill embodying the present invention, partially broken away to reveal details of structure;

FIG. 9 is a fragmentary side elevational view of the same end mill as in FIG. 8, partially broken away to reveal details of structure;

FIG. 10 is a greatly enlarged fragmentary view providing a pictorial representation of the cutting edge of the end mill of FIGS. 8 and 9; and FIG. 11 is a fragmentary side elevational view of a milling cutter for cutting the flutes of the end mill of FIGS. 8 to 10.

Figure 1:
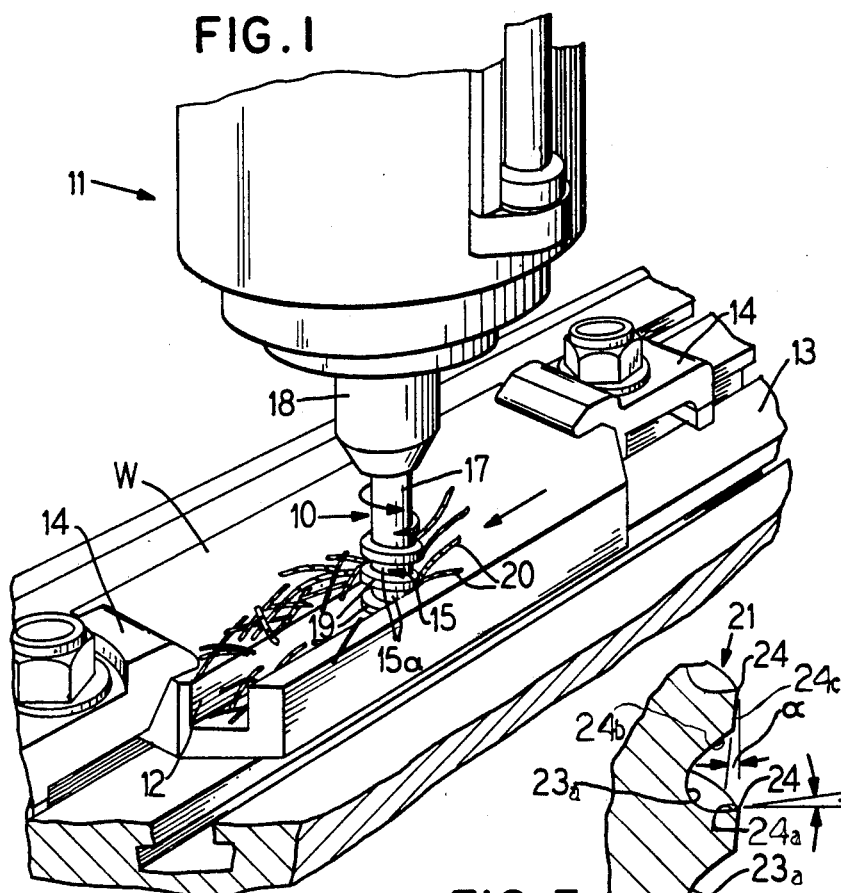
FIG. 1 is a fragmentary perspective view of a milling machine demonstrating the use of a left hand end mill embodying the invention.

As shown in FIG. 1, an end mill 10 embodying the present invention is operatively mounted in a vertical spindle milling machine 11 for shaping a workpiece W, for example, by cutting a kerf 12 therein. The workpiece W may be held to a bed 13 of the milling machine as by means of customary clamps 14. At one end of its cylindrical shaft 15, the end mill 10 has a shank 17 for chucking the end mill in spindle 18 of the milling machine 11. Helical flutes 15a in the shaft 15 provide helical cutting edges 19 facing generally toward the shank 17 and running out at the end of the shaft 15 opposite to the shank 17. As shown, the end mill 10 is of the left hand type.

I have discovered that unexpected new and improved results are attained by providing the cutting edges 19 with a helix pitch angle of from 10° to 30° in contrast to the extremely high pitch angle cutting edges in conventional end mills. I have found that my end mill will cut at a center thrust infeed rate of as much as 1½ inches per minute at 50 to 100 rpm and effects a full depth cut smoothly in one pass at that rpm and infeed rate. Because of the slow operating speed my end mill can be run without coolant, but if coolant is used, the end mill can be run at a higher speed and greater infeed rate. Within the lower operating speeds in the range, the end mill remains relatively cool even without coolant.

Figure 7:
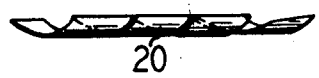
FIG. 7 is an elevational view of a representative chip generated by the end mills of the present invention.

Another unusual aspect in the operation of my new and improved end mill is that chips 20 (FIGS. 1 and 7) are formed which are of substantially uniform length equal to the depth of cut and are generated smoothly and substantially uniformly as tightly curled substantially straight units which simply rise in the flutes 15a and quietly lie over onto the work W. This is in sharp contrast to conventional end mills which produce small chips that are flung from the tool, and results not only from the action of the cutting edge 19 but also from the cross sectional chip forming geometry of the flutes 15a, best understood on reference to FIGS. 2 and 3.

Figure 2:
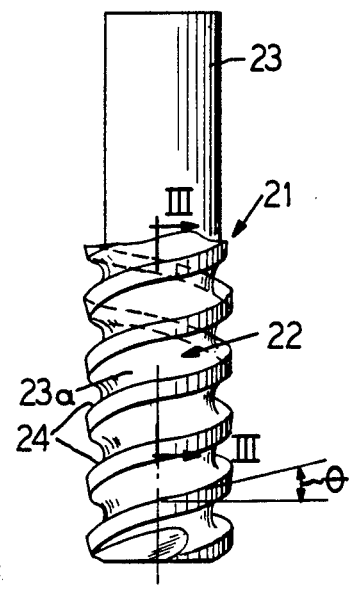
FIG. 2 is an elevational view of a right hand end mill embodying the invention.

In FIG. 2, an end mill 21 in accordance with the present invention has a cylindrical shaft 22 at one end of which is a chucking shank 23 and which is provided with right hand flutes 23a which run out at the opposite end of the shaft from the shank 23. Each of the flutes 23a has along its side which faces toward the shank 23 a respective cutting edge 24 (FIGS. 2 and 3) having a helix pitch angle of about 15° where the overall diameter of the shaft 22 is about one inch and the depth of the volute flutes 23 is about ⅛th inch and a width of about ¼ inch, there being two flutes 23a in the illustrated instance. In this instance, a helix pitch angle $\theta$ of about 15° may be provided for the cutting edges 24.

Figure 3:
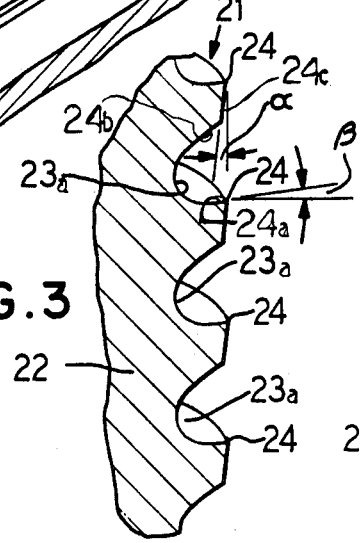
FIG. 3 is an enlarged fragmentary sectional detail view taken substantially along the line III—III of FIG. 2.
Figure 4:
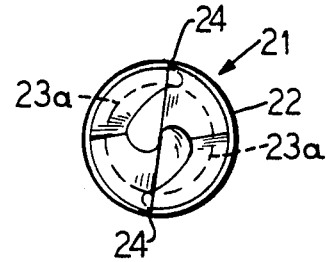
FIG. 4 is a flute runout end view of the end mill of FIG. 2.

As shown in FIG. 3, a suitable relief angle $\alpha$ of 5° to 7° and a rake angle $\beta$ of about 5° to 7° may be provided for each of the cutting edges 24. A surface 24a, providing the rake angle, slopes on a concave curvature away from the cutting edge 24 and merges on a continuing concave upsweep curvature with an overhang surface 24b which runs out at the lower side of a surface 24c providing the relief angle. The surfaces 24a and 24b in cooperation with the cutting edge 24 run continuously along each flute 23a from the flute runout at the lower end tip of the tool to the shank 23, and act to produce the tightly curled chips 20 of a length substantially equal to the depth of the cut being made in the workpiece by the tool.

Figure 5:
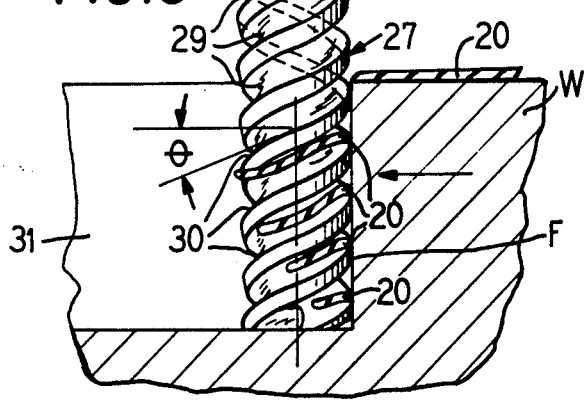
FIG. 5 is a schematic illustration showing a modified end mill embodying the present invention and demonstrating chip cutting and formation.
Figure 6:
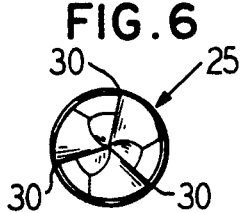
FIG. 6 is a flute runout end view of the end mill in FIG. 5.

FIG. 5 shows not only another form of end mill 25 embodying the invention, but also illustrates substantially how the chips 20 are generated during center thrust cutting by the new and improved cutting edge means provided by the present invention. By way of example, the end mill 25 may have its shaft 27 of about ¾ inch diameter topped by a chucking shank 28 and provided with a plurality, such as three, helical flutes 29 running out at the end of the shaft opposite to the shank 28. The flutes 29 may be about 1/16 inch deep by 3/16 inch wide and define spiral cutting edges 30 facing generally toward the shank 28. In the end mill 25 the rake and relief angles and the surfaces providing the same as well as other associated surfaces in the flutes 29 and in association with the cutting edges 30 may be substantially the same as described in connection with the end mill 21; but the helix pitch angle $\theta$ is desirably about 25° which has been found to afford generally optimum cutting results, although good results are attainable throughout the 10° to 30° range, depending upon the material to be worked and the size of the end mill.

Having regard to formation of the chips 20 as more or less schematically represented in FIG. 5, as well as in FIGS. 1 and 2, as the end mill feeds into the work W by relative movement of the work and the end mill, represented by the horizontal arrows in FIG. 5, and cuts the kerf 31 to the full depth desired in one pass, the chips 20 are progressively generated by the end mill cutting edges starting at the bottom of the kerf and then progressively elongating and riding up the respective end mill flutes as chip generation proceeds along the work face F of the workpiece W. At termination of generation of each of the chips 20, at the top of the work face F, each chip simply leaves the associated end mill flute and is quietly received on the top surface of the work W.

On reference to FIGS. 8–10, another and improved end mill cutter 35 according to the present invention is depicted which not only provides for greatly increased cutting efficiency, but also provides what is believed to be unique in that both rough milling and surface finishing of the surfaces of the cut is attained in one pass. Insofar as I am aware, all prior end mills have operated on the basis that after the end mill cut had been completed it was necessary to smooth and finish the cut surfaces if that was a necessary condition. On the other hand, the end mill 35 as depicted not only performs its cutting function with greatly improved efficiency, but at the same time provides the cut surfaces with a microfinish, that is a virtually mirror finish. As is customary with end mills, the end mill 35 has a shaft 37 topped by a chucking shank 38. A plurality, such as three helical flutes 39 extend continuously from the lower end (not shown) of the shaft 37 to the shank 38.

Each of the flutes 39 has at the outer perimeter of its side which faces toward the shank 38 a respective cutting edge 40 with preferably a helix pitch angle of about 25°. Where the outside diameter of the shaft 37 and where desired also the shank 38 is 1¼ inch in diameter, the depth of the flutes may be about 3/16 inch deep by about ½ inch in width. The rake and relief angles associated with the cutting edge 40 may be substantially the same as described in connection with the end mill 21 of FIG. 2. A relief surface 41 may be of about 1/32 inch width leading downwardly to a relief surface extension 42 which may be about 3/32 inch in width and of slightly concave cross section and of slightly greater sloping angularity relative to a cylinder projected along the cutting edges 40 than the relief surface 41. At the radially inner side of the cutting edge 40 in each instance, a rake angle surface 43 slopes concavely from the associated cutting edge 40 generally radially inwardly and downwardly and merges on a continuing concave curvature with an upsweep surface 44 merging with an upwardly extending transition surface 45 leading into an upwardly and outwardly extending sloping overhang surface 47. As will be apparent, all of the surfaces 43, 44, 45 and 47 run continuously throughout the helical extent from end-to-end of the associated flute 39. In a milling cutting pass the cutting edges 40, and the associated surfaces within the flute 39 in each instance, produce tightly curled chips of a length substantially equal to the depth of cut being made in the workpiece by the end mill 35, substantially the same as described in connection with FIGS. 1 and 5.

Improved cutting of the edge 40 is attained by the provision of teeth 48 substantially uniformly along the entire length of each of the cutting edges 40. In a preferred form, the teeth 48 are of generally shallow undulant form with narrow cutting edge crests and shallow intervening depressions, as more or less schematically exemplified in FIG. 10. The depressions between the teeth 48 are at the cutting edge ends of shallow scoring grooves 48a. In a desirable form, the scoring grooves 48a are of generally spiral form starting at or adjacent to the upswing area 44 and running on the rake area 43 to run out at the cutting edge 40. The spiral orientation of the scoring grooves 48a sweeps generally opposite to the cutting direction of the cutting edge 40, as indicated generally by the arrow 49 in FIG. 8, that is in the clockwise direction and the scoring grooves 48a running generally in counterclockwise direction. The groove scorings 48a may be from 0.008 inch to 0.025 inch at their greatest depth in a one-inch diameter tool, that is the depth adjacent to the cutting edge 40 and the maximum width may be about twice the depth.

Performance of the end mill 35 is extraordinary. Where the end mill 35 is of 3-inch outside diameter and 6-inch flute length a keyway or slot is adapted to be milled throughout the flute length, in material having the general characteristics of aluminum at about 25 inches per minute, removing 450 to 470 cubic inches a minute, at about half the energy requirements of conventional end mills, and the completed keyway or slot will not only be roughed out but in the same pass microfinished. Tool steel is adapted to be milled by the end mill 35 at 40 rpm without coolant. With the aid of coolant, the end mill may be operated up to 4000 rpm to cut a key way or a kerf at a rate of 1000 inches per minute. The economies attainable by means of the end mill 35 are thus quite apparent.

Production of the end mill 35 is adapted to be effected economically by milling the flutes 39 by means of a wheel type milling cutter 50 (FIGS. 9 and 11) having cutting teeth 51 especially ground and then adapted to be operated to mill out the flutes 39 in the conventional manner of fluting end mills. The milling cutter teeth 51 are especially ground to shape the flutes 39 with the surfaces 43, 44, 45 and 47 previously described. In addition, the milling cutter 50 has a tooth 52 provided with a scoring tip 53 which cuts the score grooves 48a as the cutter 50 functions to cut the flute 39. For example, the cutter 50 may have twenty-one of the teeth 51 and one of the scoring teeth 52, there being one of the score grooves 48 produced in each revolution of the cutter 50 while forming the flute 39.

It will be understood that variations and modifications may be effected without departing from the spirit and scope of the novel concepts of this invention.

I claim:

1. In an end mill having an elongate cylindrical shaft provided at an upper end with a shank for chucking the end mill in a milling machine spindle, and said shaft being equipped with flutes presenting helical workpiece cutting edges running out at the opposite lower end of the shaft, comprising:
   said cutting edges having a helix pitch angle of from 10° to 30°'
   surfaces at each flute defining with the cutting edge of the flute a rake angle and relief angle both of which are about 5° to 7°;
   said rake angle surface sloping away from said upper end and toward said lower end on a concave curvature away from said cutting edge and merging by way of a continuing concave upsweep curvature with an overhang surface which runs out toward the relief angle surface thereabove;
   and said rake angle and relief angle surfaces in cooperation with said cutting edge running continuously along each flute from said shank to said lower end of the shaft and operating in center thrust cutting operation to cut from the workpiece tightly curled chips substantially as long as the depth of cut in the workpiece.

2. An end mill according to claim 1, wherein there are two of said flutes and cooperative relief angle and rake angle surfaces and cutting edges.

3. An end mill according to claim 1, wherein there are three of said flutes and cooperative relief angle and rake angle surfaces and cutting edges.

4. An end mill according to claim 1 wherein said cutting edge has a uniform continuous series of teeth which are defined at outer ends of scoring grooves in said concave rake angle surface.

5. An end mill according to claim 4, wherein said scoring grooves extend substantially throughout the width of said rake angle surface and are helical and sweep generally opposite to the cutting direction of the respective cutting edges in operation of the end mill.

6. An end mill according to claim 1, wherein said cutting edges have throughout their lengths uniformly continuous undulant teeth.

7. A method of milling a workpiece with an end mill having an elongate cylindrical shaft provided at an upper end with a shank for chucking the end mill in a milling machine spindle, and equipped with flutes providing helical cutting edges extending from said shank and running out at an opposite lower end of the shaft, said method comprising:
   providing said cutting edges with a helix pitch angle of from 10° to 30° and thoughout the length of each of the cutting edges providing a concave rake surface sloping toward said lower end and away from the cutting edge and merging with an upsweep surface leading into an overhang surface;
   operating said end mill in center thrust cutting relation to the workpiece;
   and in such operating of the end mill causing said cutting edges and said surfaces to cooperate to cut from the workpiece and form tightly curled substantially straight elongated chips substantially as long as the depth of cut in the workpiece.

8. A method according to claim 7, which comprises providing rake and relief surfaces both of about 5° to 7° angle to respective reference planes at the cutting edges.

9. A method according to claim 7, which comprises effecting said operation of the end mill to full depth of cut in the workpiece in a single pass.

10. A method according to claim 7, which comprises causing said chips to rise in said flutes and quietly lie on top of the workpiece.

11. A method according to claim 7, which comprises in operating said end mill starting a cut in the workpiece at the full depth desired and continuing the cutting uninterruptedly to the end of the cut, and simultaneously microfinishing surfaces in the cut.

12. A method according to claim 7, which comprises forming said cutting edges substantially throughout their length with uniform series of small undulant teeth and thereby operating the end mill at an increased operating rate and effecting microfinish of cut surfaces on the workpiece.

13. A method according to claim 12, which comprises forming generally helical score grooves in the rake surfaces and running said grooves out at said cutting edges and thereby providing said teeth at the ends of said score grooves at said cutting edges.

14. An end mill having an elongate cylindrical shaft having an upper end with a shank for chucking the end mill in a milling machine spindle and a lower end, and comprising:

at least one helical flute in said shaft and presenting a cutting edge extending continuously from said shank to said lower end of said shaft;

a rake surface of concave cross section extending along said cutting edge and sloping generally radially inwardly and toward said lower end;

scoring grooves in said rake surface running out at said cutting edge and defining small teeth on said cutting edge;

and said scoring grooves being of spiral form sweeping in opposite direction to the cutting direction of said cutting edge when operated formilling.

15. An end mill according to claim 14, wherein said scoring grooves are about twice as wide as deep at said teeth.

* * * * *